United States Patent
Morinet et al.

(10) Patent No.: US 6,812,431 B2
(45) Date of Patent: Nov. 2, 2004

(54) APPARATUS AND A METHOD FOR HEATING MOTOR VEHICLE SEATS

(75) Inventors: Laurent Morinet, Neuilly Plaisance (FR); Hervé Dirand, Valentigney (FR)

(73) Assignee: Faurecia Sieges d'Automobile S.A., Nanterre (FR)

( * ) Notice: Subject to any disclaimer, the term of this patent is extended or adjusted under 35 U.S.C. 154(b) by 0 days.

(21) Appl. No.: 10/464,679

(22) Filed: Jun. 18, 2003

(65) Prior Publication Data

US 2004/0021346 A1 Feb. 5, 2004

(30) Foreign Application Priority Data

Jul. 3, 2002 (FR) .............................................. 02 08312

(51) Int. Cl.$^7$ ................................................. H05B 3/00
(52) U.S. Cl. ........................................................ 219/217
(58) Field of Search .............................. 219/217, 522, 219/528, 543, 544

(56) References Cited

U.S. PATENT DOCUMENTS

| | | | |
|---|---|---|---|
| 6,179,378 B1 * | 1/2001 | Baumgartner et al. . | 297/180.12 |
| 6,271,760 B1 * | 8/2001 | Watanabe et al. ........... | 340/667 |
| 6,523,417 B1 * | 2/2003 | Donahue et al. .............. | 73/800 |
| 6,538,405 B1 * | 3/2003 | Brzozowski et al. ........ | 318/280 |
| 6,541,737 B1 * | 4/2003 | Eksin et al. ................. | 219/217 |
| 6,686,562 B1 * | 2/2004 | Weiss et al. ................. | 219/217 |

FOREIGN PATENT DOCUMENTS

| | | |
|---|---|---|
| DE | 4110702 A | 10/1992 |
| DE | 19724168 | 8/1998 |
| EP | 0 577 686 B1 | 10/1994 |
| FR | 2802634 | 6/2001 |
| FR | 2817032 | 5/2002 |
| FR | 2817033 | 5/2002 |
| FR | 2817034 | 5/2002 |
| FR | 2817035 | 5/2002 |
| FR | 2817036 | 5/2002 |
| FR | 2826723 | 1/2003 |
| WO | WO-9505766 | 8/1994 |
| WO | WO-95/13204 | 5/1995 |
| WO | WO 00/25098 | 5/2000 |
| WO | WO 02/06083 A1 | 1/2002 |

OTHER PUBLICATIONS

International Search Report for French Patent Application No. FR 0208312; report dated Apr. 8, 2003.

\* cited by examiner

Primary Examiner—Robin O. Evans
Assistant Examiner—Vinod Patel
(74) Attorney, Agent, or Firm—Marshall, Gerstein & Borun LLP

(57) ABSTRACT

Apparatus for heating a motor vehicle seat comprises a heater mat and a measurement mat having capacitive sensors. The heater mat is disconnected throughout the entire period of performing a measurement using the sensors. The invention also provides a method of implementing the above apparatus.

7 Claims, 4 Drawing Sheets

APPARATUS AND A METHOD FOR HEATING MOTOR VEHICLE SEATS

The present invention relates to apparatuses and to methods for heating motor vehicle seats.

More particularly, the invention relates to apparatus for heating a motor vehicle seat, the apparatus comprising:

a heater mat comprising an electrical resistance element connected to two terminals of an electrical power supply, advantageously a positive terminal and a negative terminal;

a measurement mat, e.g. for characterizing the occupant of the seat in terms of weight and/or position, said measurement mat comprising at least one capacitive sensor itself comprising at least two electrodes; and control means for disconnecting the power supply to the heater mat and adapted to disconnect the electrical resistance element from at least one of the two terminals of the electrical power supply.

BACKGROUND OF THE INVENTION

International patent application WO 02/06083 describes an example of one such heater apparatus, in which the power supply to the heating mat is interrupted immediately before picking up a measurement signal from a sensor.

However, it has been found that the measurements provided by that type of apparatus lack accuracy and reliability, with uncertainty concerning measurements of weight and of position then possibly being greater than 65%.

OBJECTS AND SUMMARY OF THE INVENTION

A particular object of the present invention is to mitigate that drawback.

To this end, according to the invention, apparatus of the kind in question further comprises:

switch means connected to at least two of the electrodes and adapted, in a first state, to charge the sensor electrically by imposing a charging potential to at least one of the electrodes, while taking another electrode to a reference potential, and in a second state, to discharge the sensor into an electric charge measurement circuit; and the means for disconnecting the power supply to the heater mat disconnect the electrical resistance element from at least one of the two terminals of the electrical power supply while the switch means of the measurement mat are in the first and second states.

By means of these dispositions, the heating mat is out of operation throughout the time that each sensor is in operation. The shielding caused by the heating mat is thus reduced not only during the first step corresponding to a measurement-taking stage, but also during the second step corresponding to a stage of delivering measured magnitudes, contrary to the above-specified prior art apparatus which avoids the shielding effect only during the second step, whereas the shielding effect also disturbs measurement during the measurement-taking stage.

The shielding effect is further decreased when:

the control means for disconnecting the power supply to the heater mat are adapted to disconnect both terminals of the electrical power supply from the electrical resistance element while the switch means of the measurement mat are in the first and second states; and/or when:

the control means for disconnecting the power supply to the heater mat are adapted to raise at least one of the two terminals of the electrical power supply for the electrical resistance element to the charging potential while the switch means of the measurement mat are in the first state; it is thus possible to have either both electrical power supply terminals connected to the charging potential, or one of the two terminals connected to the charging potential while the other is floating; in the first case uncertainty on the measurement performed by each sensor can be less than 10%.

In another aspect, the invention provides a method of heating a motor vehicle seat, in which a heater mat comprising an electrical resistance element is powered electrically, the mat being electrically connected to two terminals of an electrical power supply and serving to heat at least a portion of the motor vehicle seat, the method comprising:

a) a first step in which the electrical resistance element is disconnected from at least one of the two terminals of the electrical power supply;

b) a second step in which a capacitive sensor of a measurement mat having at least one sensor is charged by being connected between a charging potential and a reference potential;

c) a third step in which the charge stored in the sensor during the preceding step is measured by disconnecting the sensor from the charging potential and connecting it to a measurement circuit for measuring electric charge; and d) a fourth step in which the electrical resistance element is reconnected to the terminal from which it was disconnected in the first step so as to enable at least a portion of the seat to be heated.

In preferred implementations of the invention, use may optionally also be made of one or more of the following dispositions:

the second and third steps are repeated for each of the sensors of the measurement mat prior to moving onto to the fourth step;

during the first step, both terminals of the electrical power supply are disconnected from the electrical resistance element; and during the second step, at least one of the two terminals of the electrical power supply is taken to the charging potential.

BRIEF DESCRIPTION OF THE DRAWINGS

Other aspects, objects, and advantages of the invention appear on reading the following description of an embodiment.

The invention will also be better understood with the help of the drawings, in which.

MORE DETAILED DESCRIPTION

In the various figures, the same references are used to designate elements that are identical or similar.

By way of example, an embodiment of apparatus of the invention is described below.

In this embodiment, the apparatus of the invention is for fitting to a motor vehicle seat 1.

Figure 1:
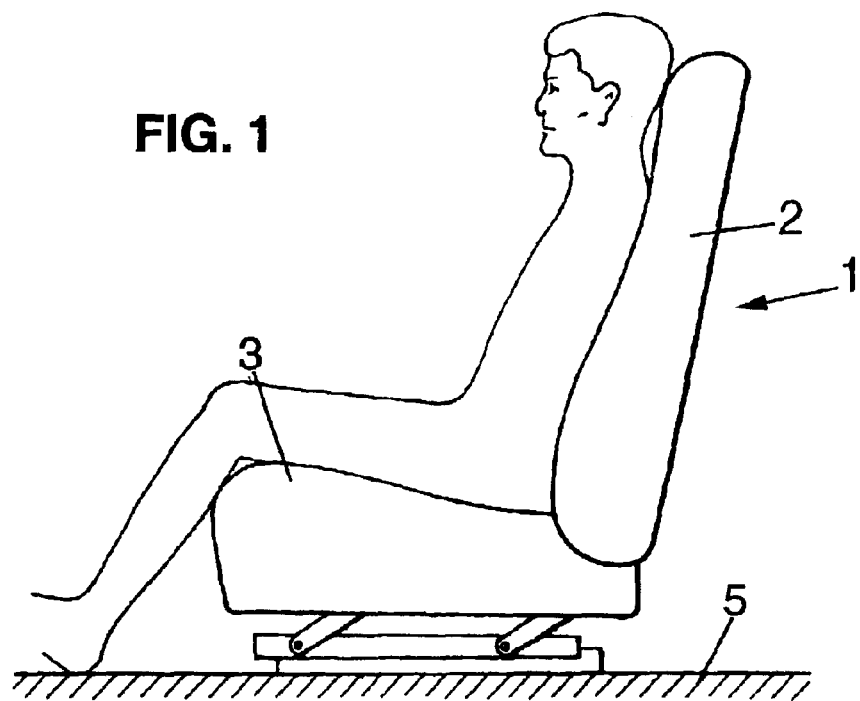
FIG. 1 is a diagrammatic side elevation view of a motor vehicle seat in which heater apparatus in accordance with the present invention can be mounted.

As shown in FIG. 1, the seat 1 comprises a back 2 and a seat proper 3 for supporting a user 4 or some other load of mass M. The seat proper itself is in turn supported by the floor 5 of the vehicle.

Figure 2:
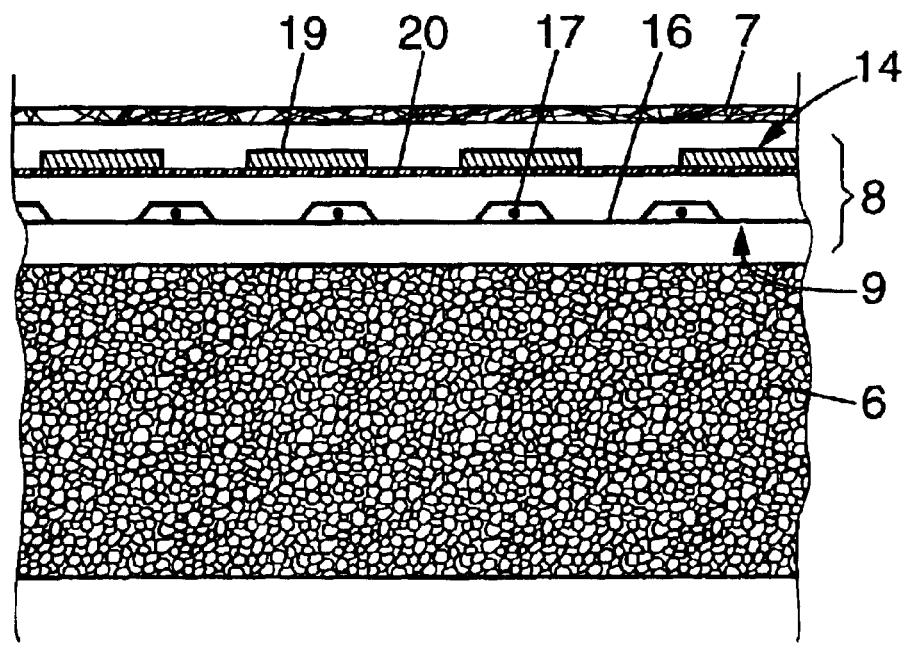
FIG. 2 is a diagrammatic section through a portion of the padding of the seat shown in FIG. 1, in which heater apparatus in accordance with the present invention has been inserted.

As shown in FIG. 2, the seat back 2 and the seat proper 3 comprise padding 6 and a cover 7 made of materials of the same type as are generally used in motor vehicle seats.

Figure 3:
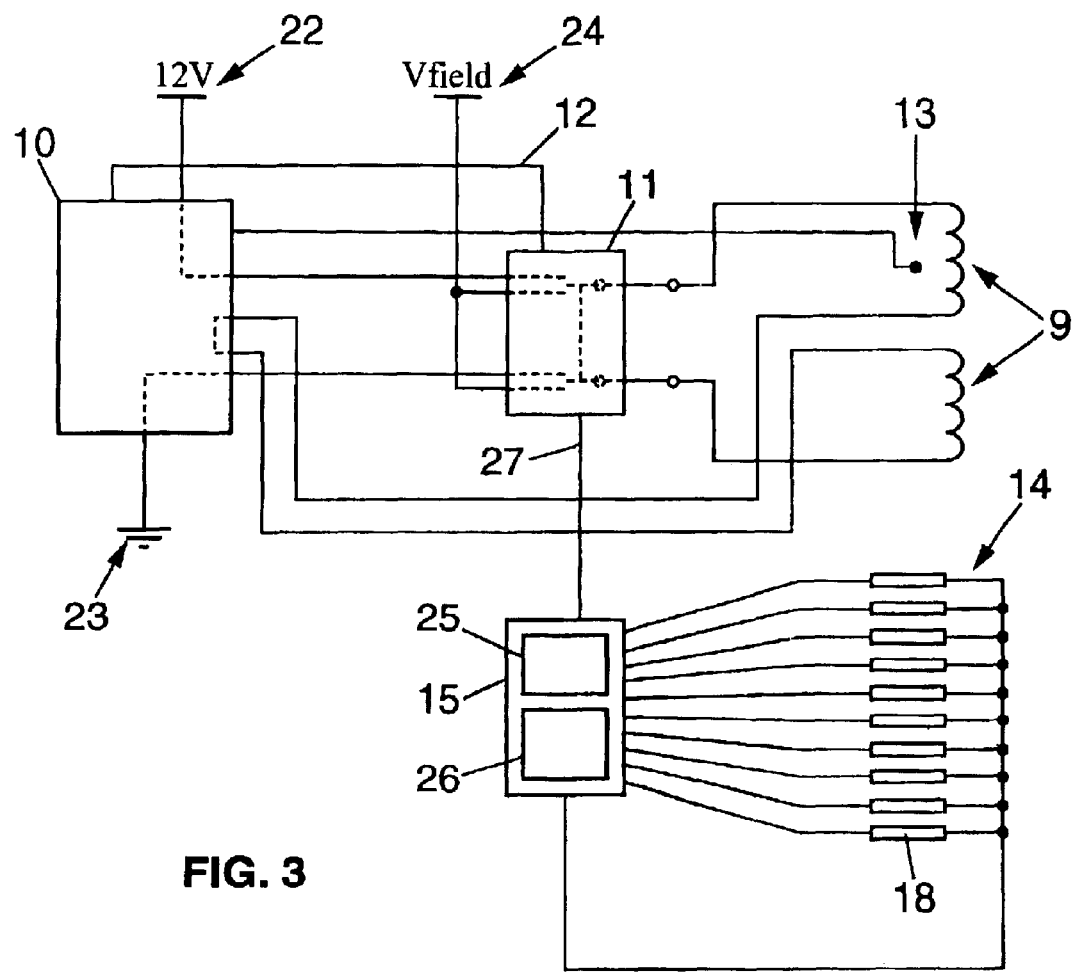
FIG. 3 is a circuit diagram of the heater apparatus shown in FIG. 2.

The seat 1 also has heater apparatus 8 shown in the diagram of FIG. 3 and comprising:

two heating mats 9 (one for the back 2 and the other for the seat proper 3);

a heating control unit 10 for the heater mats 9;

a connection control unit 11 for the heater mats 9;

a controlling connection 12 between the heating control unit 10 and the connection control unit 11;

optionally a temperature sensor 13;

at least one measurement mat 14; and a measurement unit 15 for controlling each measurement mat 14.

The connection control unit 11 and the measurement unit 15 are shown in FIG. 3 as being distinct entities, however in a variant they could be united in a single unit.

The heater and measurement mats 9 and 14 are inserted between the padding 6 and the cover 7 (see FIG. 2).

Advantageously, each heater mat 9 comprises a linen cloth 16 having a wire 17 forming an electrical resistance sewn thereto.

Also advantageously, each measurement mat 14 comprises five probes 18. Each probe 18 comprises at least one capacitive sensor. By way of non-limiting example, each probe 18 is constituted by three electrodes, themselves constituted by conductive tracks 19 silkscreen-printed on a polyester layer 20 using a conductive ink based on silver. The tracks 19 are covered in a layer leakproof material presenting dielectric characteristics that are stable with temperature.

Advantageously, these tracks 19 are:

of width lying substantially in the range 0.5 millimeters (mm) to 5 mm;

of length corresponding to the size of the zone in which a measurement is to be performed;

of thickness lying substantially in the range a few microns ($\mu$m) to 0.5 mm.

Advantageously, they are spaced apart from one another by a distance substantially lying in the range 5 mm to 40 mm.

Figure 4:
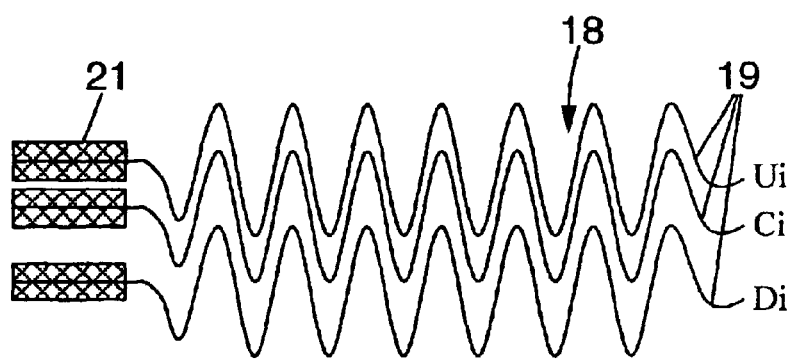
FIG. 4 is a diagram of a measurement-taking probe of the heater apparatus shown in FIGS. 2 and 3.

By way of example, and as shown in FIG. 4, each probe 18 comprises three conductive elements or electrodes. Each conductive element is constituted by a track 19 respectively referenced $U_i$, $C_i$, and $D_i$ (where i=1 to 10 for the two measurement mats 14, each having five probes 18). Outside the measurement zones, the tracks 19 ($U_i$, $C_i$, and $D_i$) are protected from the surrounding medium by electrical shielding 21. Two or three of the tracks 19 ($U_i$, $C_i$, and $D_i$) taken together constitute the two electrodes of a capacitive sensor (one electrode may associate two tracks 19). It is thus possible to form the following sensors: $U_i/C_i$; $C_i/D_i$; and $U_i/D_i$ (see FIG. 6).

The heating control unit 10 forms means for powering each heater mat 9. It is electrically connected to the two terminals 22 and 23 of the electrical power supply of the vehicle (e.g. one terminal 22 at a potential positive of 12 volts (V) and another terminal 23 at ground potential).

Heating is controlled firstly by the occupant of the seat 1; information about instructions issued by the user is transmitted to the heating control unit 10 which then connects or disconnects the heater mats 9 and the terminals 22 and 23 of the electrical power supply of the vehicle.

Heating is also controlled by the connection control unit 11. This unit constitutes switch means and acts via the controlling connection 12 to govern the supply of electricity to each of the heater mats 9. It thus causes the heating control unit 10 to connect and disconnect the heater mats 9 with the terminals 22 and 23, and it serves to activate or inhibit heating by means of the heater mats 9. When the heater mats 9 are not electrically connected to the terminals 22 and 23, the connection control unit 11 can connect them to an intermediate terminal 24 at a charging potential, e.g. $V_{field}$=-7 volts.

The heating control unit 10 and the connection control unit 11 may either be internal or external relative to the measurement unit 15.

The measurement unit 15 has switch means 25 for the measurement mats 14, and a circuit 26 for measuring electric charge. The measurement unit 15 is synchronized with the connection control unit 11 by means of a synchronizing connection 27.

Two or three tracks 19 constituting the electrodes of a sensor (e.g. $U_i/C_i$, $C_i/D_i$, or $U_i/D_i$) can be electrically connected via the switch means 25 respectively to the charging potential and to the reference potential, or on the contrary they can be disconnected from at least one of said potentials.

An implementation of the method of the invention is described below.

In this implementation, measurements on the measurement mats 14 last for a measurement period $M_1$, e.g. of 10 milliseconds (ms), and they are repeated at a rate $M_2$, e.g. once every 50 ms.

When the heater mats 9 are not powered for heating purposes, for example when the user has switched them off, they nevertheless continue to be governed by the connection control unit 11 during the measurement period.

When the heater mats 9 are powered by the heating control unit 10 for the purpose of heating the seat 1, the operation of each heater mat 9 is inhibited during the measurement period. Connection of the mats to the various potentials is governed sequentially and synchronously relative to the taking of measurements via the measurement mats 14. Each heater mat 9 can thus produce heat during a heating period of 40 ms, i.e. during 80% of the time in which the apparatus of the invention is activated. Heating periods and measuring periods are separate in time.

After the heating control unit 10 has disconnected the heater units 9 at least from the terminal 22 of the vehicle's electrical power supply, the measurement period can begin. This operation of disconnecting the heater mats 9 is controlled by the connection control unit 11 via the control connection 12.

The measurement period is described in greater detail below.

Figure 5:
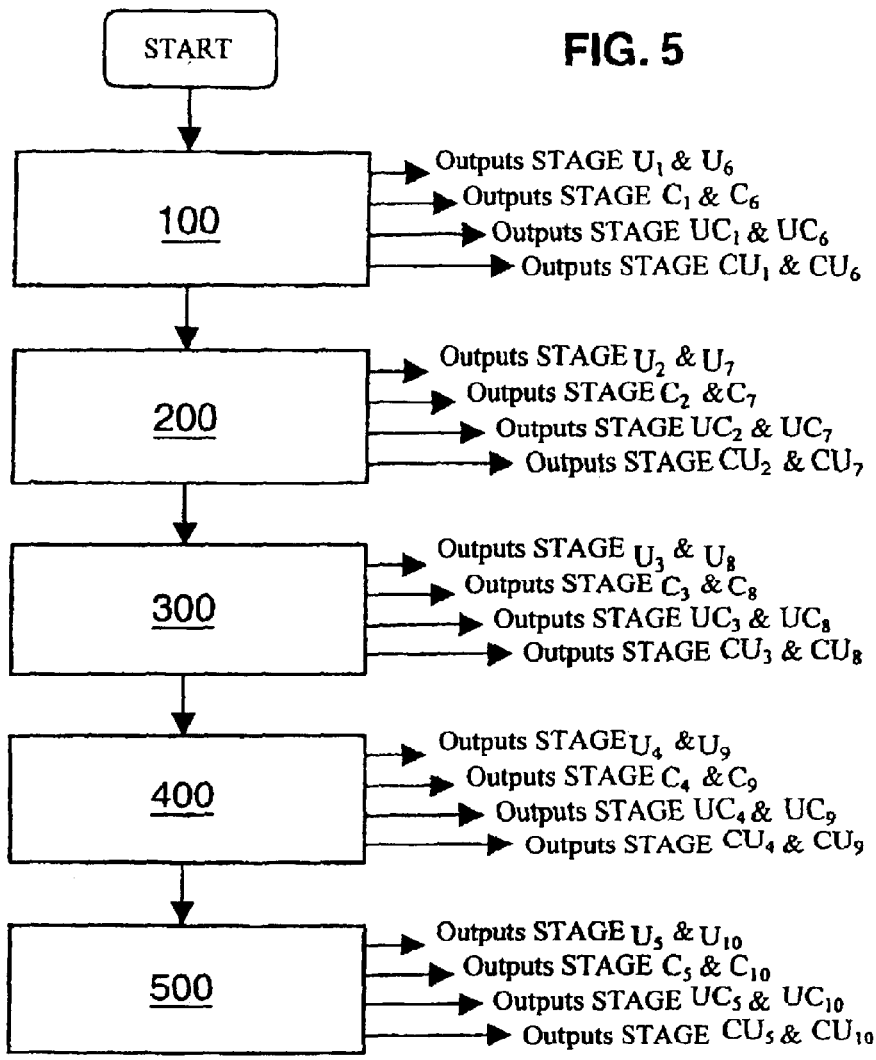
FIG. 5 is a diagram showing an example of a measurement period performed on the heater apparatus shown in FIGS. 2 and 3.
Figure 6:
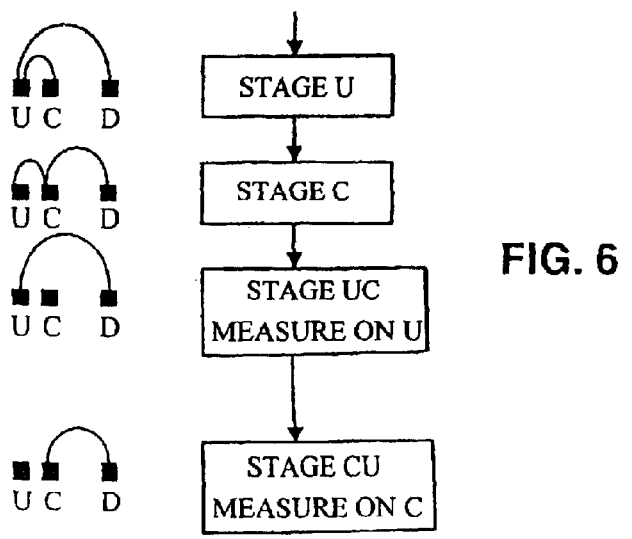
FIG. 6 is a diagram showing an example of a cycle of the period shown in FIG. 5.

As shown in FIGS. 5 and 6, the measurement period comprises five cycles 100, 200, 300, 400, and 500.

Each cycle 100, 200, 300, 400, or 500 corresponds to performing a measurement on two probes 18. During each of these cycles 100, 200, 300, 400, or 500, a measurement is performed simultaneously on probes 18 having numbers i and i+5. Thus:

during cycle 100, a measurement is performed on probes 18 numbered 1 and 6;

during cycle 200, a measurement is performed on probes 18 numbered 2 and 7;

during cycle 300, a measurement is performed on probes 18 numbered 3 and 8;

during cycle 400, a measurement is performed on probes 18 numbered 4 and 9; and during cycle 500, a measurement is performed on probes 18 numbered 5 and 10.

As shown in FIGS. 5 and 6, each cycle 100, 200, 300, 400, or 500 comprises four stages U, C, UC, and CU.

Figure 7:
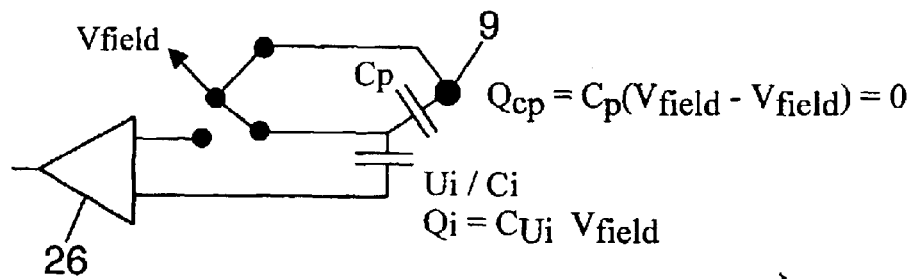
FIG. 7 is a diagram showing the step of charging a sensor of the heater apparatus shown in FIGS. 2 and 3.
Figure 8:
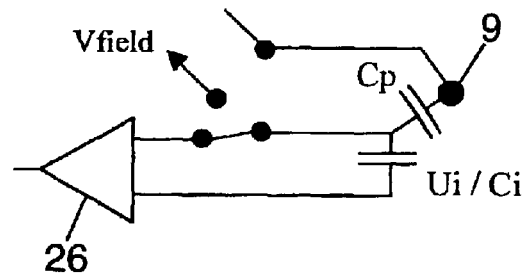
FIG. 8 is a diagram showing the step of performing a measurement on a sensor of the heater apparatus shown in FIGS. 2 and 3.

In the implementation of the method of the invention described below, each stage U, C, UC, or CU comprises:

a step shown in FIG. 7 in which one of the sensors $U_i/C_i$, $C_i/D_i$, or $U_i/D_i$ of the probe i and i+5 in a measurement mat 14 (in FIG. 7 only one of the sensors $U_i/C_i$ is shown) is charged by being connected between the charging potential $V_{field}$ and the reference potential (ground), and in the connection control unit 11, the heater mats 9 are connected to the charging potential $V_{field}$; stray capacitance $C_p$ between the heater mats 9 and the sensor $U_i/C_i$ on which the measurement is performed is thus short circuited; disturbances are therefore canceled;

another step, shown in FIG. 8 (in which only one $U_i/C_i$ of the sensors $U_i/C_i$, $C_i/D_i$, or $U_i/D_i$ is shown), during which the charge stored in the sensor $U_i/C_i$ charged during the preceding step is measured, with this being done by disconnecting it from the charging potential $V_{field}$ and connecting it to the electric charge measuring circuit 26 while simultaneously disconnecting the heater mats 9 from the charging potential $V_{field}$ so as to lie between a floating potential and the reference potential (ground).

The four stages U, C, UC, and CU are thus reproduced in each cycle 100, 200, 300, 400, or 500. At the end of the five cycles 100, 200, 300, 400, and 500, the heater mats 9 are reconnected to the terminal from which they were disconnected before the beginning of the measurement period, so as to restore a heating period and enable at least a portion of the seat 1 to be heated.

Figure 9:
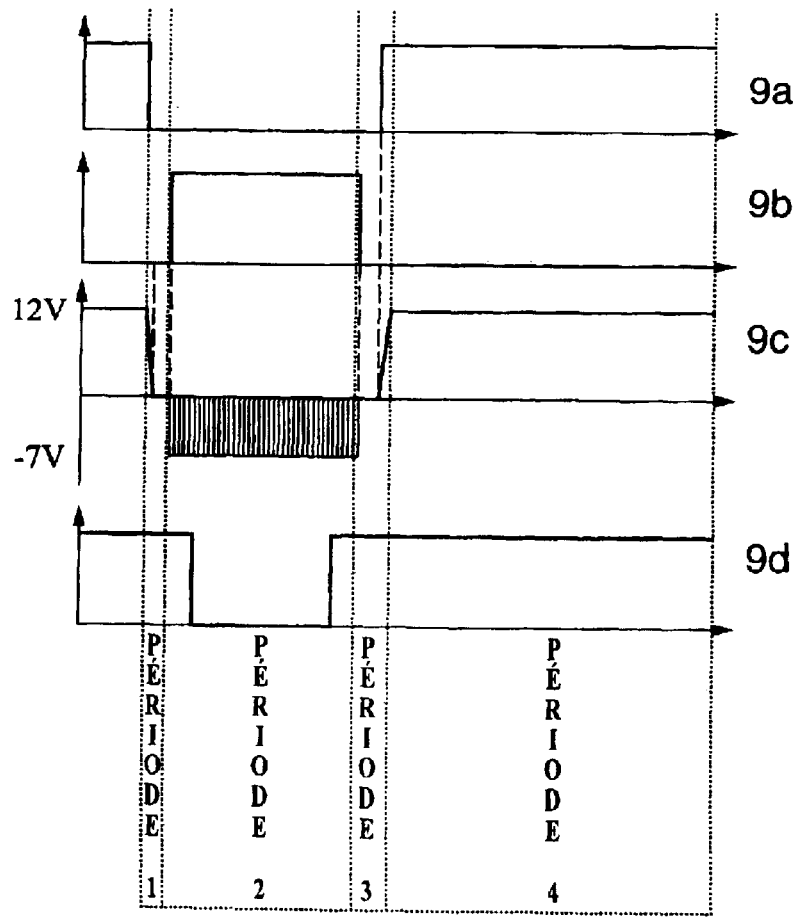
FIG. 9 is a series of timing diagrams corresponding to the measurement period shown in FIG. 5.

Various timing diagrams corresponding to the measurement period are shown in FIG. 9.

Timing diagram 9a corresponds to the control connection 12 causing the connection control unit 11 to activate and deactivate the heater mats 9.

Timing diagram 9b corresponds to the heater mats 9 being connected to charging potential $V_{field}$ by the connection control unit 11.

Timing diagram 9c corresponds to the voltage variations across the terminals of the heater mats 9.

Timing diagram 9d corresponds to the durations of the measurement periods on the probes 18 and to the durations of the computation of the mass on the seat 1 on the basis of the measurements made by the probes 18.

In these timing diagrams, the period 1 corresponds to the heater mats 9 being disconnected from the terminals 22 and 23, the period 2 corresponds to the measurement period as described above, the period 3 corresponds to said heater mats 9 being reconnected to the terminals 22 and 23, and the period 4 corresponds to a normal heating period.

What is claimed is:

1. Apparatus for heating a motor vehicle seat, the apparatus comprising:

a heater mat comprising an electrical resistance element connected to two terminals of an electrical power supply;

a measurement mat comprising at least one capacitive sensor itself comprising at least two electrodes;

control means for disconnecting the power supply to the heater mat and adapted to disconnect the electrical resistance element from at least one of the two terminals of the electrical power supply; and switch means connected to at least two of the electrodes and adapted, in a first state, to charge the sensor electrically by imposing a charging potential to at least one of the electrodes, while taking another electrode to a reference potential, and in a second state, to discharge the sensor into an electric charge measurement circuit, wherein the means for disconnecting the power supply to the heater mat disconnect the electrical resistance element from at least one of the two terminals of the electrical power supply while the switch means of the measurement mat are in the first and second states.

2. Apparatus according to claim 1, in which the control means for disconnecting the power supply to the heater mat are adapted to disconnect both terminals of the electrical power supply from the electrical resistance element while the switch means of the measurement mat are in the first and second states.

3. Apparatus according to claim 2, in which the control means for disconnecting the power supply to the heater mat are adapted to raise at least one of the two terminals of the electrical power supply for the electrical resistance element to the charging potential while the switch means of the measurement mat are in the first state.

4. A method of heating a motor vehicle seat, in which a heater mat comprising an electrical resistance element is powered electrically, the mat being electrically connected to two terminals of an electrical power supply and serving to heat at least a portion of the motor vehicle seat, the method comprising:

a) a first step in which the electrical resistance element is disconnected from at least one of the two terminals of the electrical power supply;

b) a second step in which a capacitive sensor of a measurement mat having at least one sensor is charged by being connected between a charging potential and a reference potential;

c) a third step in which the charge stored in the sensor during the preceding step is measured by disconnecting the sensor from the charging potential and connecting it to a measurement circuit for measuring electric charge; and d) a fourth step in which the electrical resistance element is reconnected to the terminal from which it was disconnected in the first step so as to enable at least a portion of the seat to be heated.

5. A method according to claim 4, in which the second and third steps are repeated for each of the sensors of the measurement mat prior to moving onto to the fourth step.

6. A method according to claim 4, in which, during the first step, both terminals of the electrical power supply are disconnected from the electrical resistance element.

7. A method according to claim 4, in which, during the second step, at least one of the two terminals of the electrical power supply is taken to the charging potential.

* * * * *